(12) United States Patent
Lindskog

(10) Patent No.: US 11,546,973 B2
(45) Date of Patent: *Jan. 3, 2023

(54) METHOD AND ARRANGEMENT FOR MANUFACTURE OF A PRODUCT OR COMPLETION OF A PRODUCT

(71) Applicant: Kjell Lindskog, Skelleftea (SE)

(72) Inventor: Kjell Lindskog, Skelleftea (SE)

( * ) Notice: Subject to any disclaimer, the term of this patent is extended or adjusted under 35 U.S.C. 154(b) by 755 days.

This patent is subject to a terminal disclaimer.

(21) Appl. No.: 16/577,070

(22) Filed: Sep. 20, 2019

(65) Prior Publication Data

US 2020/0015324 A1 Jan. 9, 2020

Related U.S. Application Data

(62) Division of application No. 15/109,498, filed as application No. PCT/SE2014/000159 on Dec. 23, 2014, now Pat. No. 10,470,252.

(30) Foreign Application Priority Data

Jan. 13, 2014 (SE) .................................... 1400015-2
Apr. 14, 2014 (SE) .................................... 1400200-0

(51) Int. Cl.
*B32B 7/06* (2019.01)
*H05B 3/26* (2006.01)
*F03D 80/40* (2016.01)
*B32B 37/00* (2006.01)
*B32B 37/12* (2006.01)
(Continued)

(52) U.S. Cl.
CPC ........... *H05B 3/267* (2013.01); *B32B 37/025* (2013.01); *B32B 37/12* (2013.01); *B32B 37/223* (2013.01); *B32B 37/26* (2013.01); *B32B 38/0008* (2013.01); *B32B 38/0036* (2013.01); *F03D 80/40* (2016.05); *B29C 65/34* (2013.01); *B29C 66/91211* (2013.01); *B29C 66/91214* (2013.01); *B32B 7/06* (2013.01); *B32B 15/02* (2013.01); *B32B 15/08* (2013.01); *B32B 15/14* (2013.01); *B32B 2037/1253* (2013.01); *B32B 2037/268* (2013.01); *B32B 2307/202* (2013.01); *B32B 2307/546* (2013.01); *B32B 2398/10* (2013.01); *B32B 2603/00* (2013.01); *H05B 3/345* (2013.01); *H05B 3/36* (2013.01); *H05B 2203/003* (2013.01); *Y02E 10/72* (2013.01); *Y02P 70/50* (2015.11)

(58) Field of Classification Search
CPC .......... B32B 7/06; B32B 15/02; B32B 15/08; B32B 2307/202; H05B 3/36; H05B 3/345
See application file for complete search history.

(56) References Cited

U.S. PATENT DOCUMENTS 6,483,086 B1 * 11/2002 Wolff ........................ H05B 3/36
219/528
10,470,252 B2 * 11/2019 Lindskog ............ B32B 38/0008

* cited by examiner

*Primary Examiner* — Elizabeth E Mulvaney
(74) *Attorney, Agent, or Firm* — Mark P. Stone

(57) ABSTRACT

The invention relates to a method for manufacture of a product or in completion of a product. A flexible mat (20) is manufactured from an incompletely cured thermo-setting plastic, wherein the mat comprises an article (10) of electrically conductive material. The incompletely cured mat (20) including the article (10) is then formed as a function of a forming tool or to lie against or for contact with a product, whereafter final curing of the mat (20) is executed by supplying electric power to the article (10) or by external heat application or ultraviolet light. The invention also relates to an arrangement and uses.

10 Claims, 3 Drawing Sheets

(51) Int. Cl.
_B32B 37/22_ (2006.01)
_B32B 37/26_ (2006.01)
_B32B 38/00_ (2006.01)
_B29C 65/00_ (2006.01)
_B29C 65/34_ (2006.01)
_B32B 15/14_ (2006.01)
_H05B 3/36_ (2006.01)
_B32B 15/02_ (2006.01)
_B32B 15/08_ (2006.01)
_H05B 3/34_ (2006.01)

METHOD AND ARRANGEMENT FOR MANUFACTURE OF A PRODUCT OR COMPLETION OF A PRODUCT

TECHNICAL FIELD

The present invention relates to a method in the manufacture of a product or in the completion of a product according to the preamble of claim 1. The invention also relates to an arrangement and uses.

BACKGROUND TO THE INVENTION

It is problematic to prevent the icing up of different objects when the need arises, such as objects, for example, which are exposed to a weather environment in which the risk of covering with ice occurs. As a non-limiting example, it can be said that the icing up of rotor wings on a wind turbine is a problem to which the present invention offers an extraordinarily effective solution. There are many different examples where a heating requirement is present and where the present invention offers a very advantageous solution to supplying heat.

Another problem is to achieve a reliable temperature measurement and temperature regulation although the actual temperature is a function among other things of the wind speed and air humidity. According to the invention, parameters of this kind can be established so that incipient ice formation or ice coating, for example, can be prevented. etc.

Yet another problem is to establish or indicate operational disturbances in mobile products, for example, so that repair measures can be applied at an early stage with the aim of preventing damage. The invention also offers attractive solutions to a large number of safety problems and alarm problems, such as shell penetrations, crack formation etc.

The present invention also facilitates the regulation of curing and final curing in an optimal manner.

OBJECT OF THE INVENTION

An object of the present invention is to provide a method and an arrangement that make possible both the production of a product and completion of a product with the use of an intermediate product.

These objects are achieved by the characterising features indicated in the claims.

Advantages of the Invention

The invention makes possible an extraordinarily advantageous alternative in the heating of objects. If necessary, the invention makes possible a simple integration solution with an existing product, for example. The invention also makes possible the production of a separate heating product that can be placed close to a desired heating place.

The invention also makes possible the indication, control and regulation of temperatures, both curing temperature and application temperature, etc.

The invention also makes possible the completion of products or products in which an indication requirement exists with regard to crack formation, penetration, etc.

The invention also makes possible the provision of an intermediate product (incompletely cured) for execution of the intended final product.

The invention has both technical and economic advantages.

BRIEF DESCRIPTION OF DRAWINGS

Embodiments of the invention will be described in greater detail below with reference to the enclosed drawings, in which.

DETAILED DESCRIPTION OF THE EMBODIMENTS SHOWN

Figure 1:
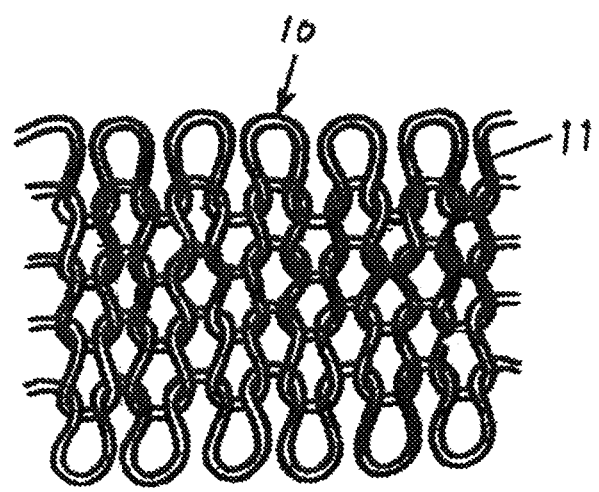
FIG. 1 shows schematically a section of an article according to the invention in a first embodiment.

FIG. 1 shows a section of an article 10 that is constructed from an electrically conductive wire 11 that has an electrically insulating outer layer so that an adjacent wire crossing is possible without the risk of a short circuit. Instead of the insulated wire 11 it is naturally possible to use an insulated tape, etc.

The article 10 is produced by a knitting operation such as shown in FIG. 1. It is understood that the shape, size and pattern of the article can of course be varied as required and desired. For example, it is possible to use a varnish insulated copper wire 11 within a diameter range of approx. 0.1-1.5 mm and a mask size of approx. 1-30 mm. The desired performance of the article naturally influences the choice of wire diameter and mask size. The article 10 shown, which has a single wire, means a single electrical circuit in the example shown. If the article 10 is knitted from double wire, two electrical circuits are made possible, etc. A mat 20 according to the invention can of course contain several articles of different types.

The mat 20 can also be produced in an alternative embodiment by a crocheting operation, for example, or other wire placement using electrically conductive wire 11 or a tape that has an electrically insulating outer layer, so that an adjacent wire crossing or tape crossing is possible without the risk of short circuit. If wire crossing is avoided, the wire/tape can be uninsulated in certain cases.

It is understood that the size, shape and wire or tape pattern of the mat 20 can of course be varied as required or desired. The same prerequisites as in the case of the pattern variant described above are applicable as regards wire choice, tape choice, wire placement, etc. If the mat 20 is manufactured from double wire or double tape, two circuits are made possible. Alternatively, one circuit can be used as a reserve circuit in case of a wire or tape break.

Figure 2:
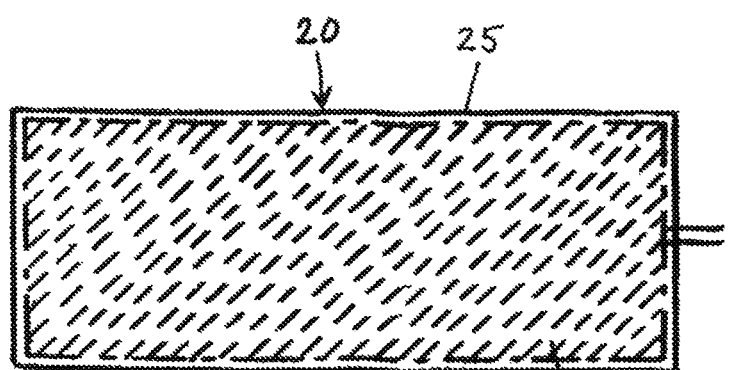
FIG. 2 shows schematically, in a view from above, a flexible mat according to the invention.
Figure 3:
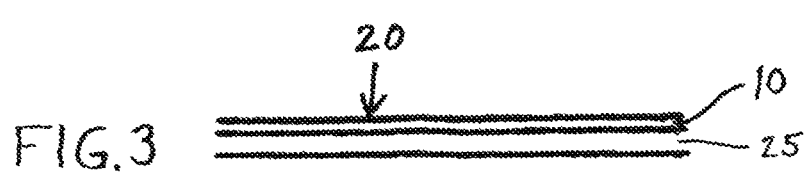
FIG. 3 shows schematically a section of the mat including the article in a cross section.

FIGS. 2 and 3 show schematically a mat 20, constructed according to any of the alternatives above, which includes a partial mat 25 of incompletely cured thermosetting plastic that can be reinforced with suitable reinforcement material. The thermosetting plastic can be of polyester, epoxy plastic or polyurethane, for example, and any reinforcement can be of glass fibre or carbon fibre, for example.

Figure 4:
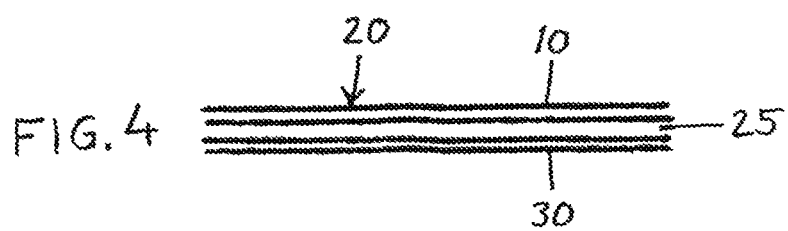
FIG. 4 shows schematically, in a cross section, a section of a mat that also includes a protective foil.

The incompletely cured partial mat 25 brings about an adhesion of the article 10 so that they form a coherent unit with a moldability/bendability that means that it can be stored and transported rolled or folded up. It is advantageous in this case to apply a temporary protective foil 30 at least to the side of the partial mat 25 facing away from the article to eliminate sticking together in the case of rolling or folding up to simplify transportation, for example. The protective foil 30 is shown in FIG. 4.

According to the method according to the invention, a knitted or crocheted article 10 or an article 10 formed in another way is used in combination with at least one partial mat 25, 26 to form a product or completion of a product. The article 10 is naturally adapted to requirements with regard to size, shape and electrical resistance so that it meets suitable technical requirements for the fulfilment of its task.

Figure 5:
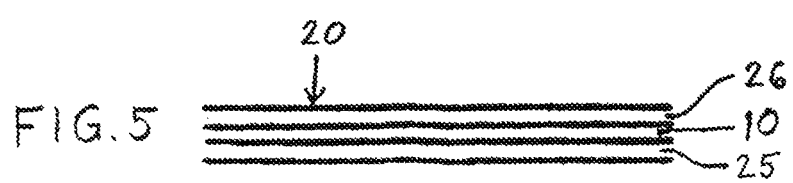
FIG. 5 shows schematically, in a cross section, a section of a mat in another embodiment.

FIG. 5 shows a mat 20 that comprises two partial mats 25, 26 of incompletely cured thermosetting plastic with any reinforcement in accordance with what is described and exemplified above, wherein the article or articles 10 is/are arranged adhesively between the partial mats. Any protective foils can naturally be affixed according to the line of reasoning above.

It should be noted that the mat 20 including the article 10 is an assembled unit that in itself constitutes a partial product. The necessary adhesion can be strengthened by a partial curing upon compression of the mat 20. Protective foils are applied as desired and required.

When the article 10 is anchored on one or two partial mats 25, 26 of an incompletely cured thermosetting plastic, application takes place to an actual object in the form of a product that is to be completed, for example, in that the incompletely cured thermosetting plastic is finally cured. Any protective foils 30 have naturally been removed before the last-named application operation, wherein the mat 20 containing the article 10 including the partial mat/mats 25, 26 is shaped as a function of the shape of the product. Final curing can be regulated and controlled by temperature measurement via the article 10 and the supply of heat via a regulated power supply to the article at the same time as the mat 20 including the article 10 adheres to the product.

Figure 6:
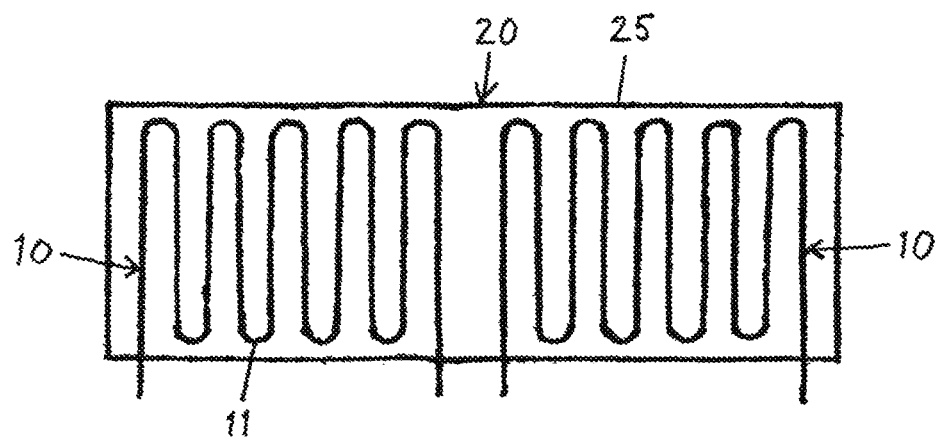
FIG. 6 shows schematically, in a view from above, a mat in a second embodiment.

FIG. 6 shows a mat 20 according to the invention that comprises two articles 10 of electrically conductive wire or two electrically conductive tapes so that possibilities exist for two electrical current circuits etc. Several parallel electrical circuits normally increase safety and normally require a lower operating voltage.

It is understood that the meander-like placement of the wire or tape 11 in this case on supporting film, for example, can take place through the so-called printed circuit method or by laying out on a foil provided with adhesive capacity which can thereby form the article 10. The properties of the article 10 can thus be varied as a function of the desired application method for the wire or tape 11. The wire/tape 11 can naturally also be laid in a pattern directly on the partial mat 25.

It is understood that the size, shape and conductive pattern of the mat 20 can of course be varied as required and desired. If electrically insulated tape or wires is/are used, tape or wire crossings as described earlier are also made possible.

It is understood that the mat 20 shown in FIG. 6 can naturally have construction variants as shown in FIG. 3-5, for example.

Figure 7:
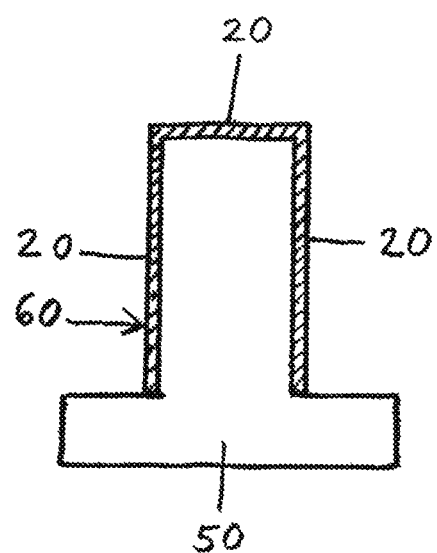
FIG. 7 shows schematically a vertical section through a tool on which an exampie of a product according to the invention is manufactured.

FIG. 7 shows an example of how mats according to the invention can be formed by a forming tool to form a distinct product. A required number of mats 20 is formed to lie close to a fixture or tool 50 such as shown in the figure. The tool shown has a horizontal cross section that is rectangular. The product 60 shown is thus box-shaped. A release agent against the tool 50 can be a protective foil, for example, that is borne by the mat/mats 20 or a release agent arranged on the tool. The final curing progression is controlled according to the invention by resistance measurement of the article 10 and curing heat is produced by electric power supply to the product or by an external heat source that can be integrated with the tool or UV light. The finally cured product 60 is removed from the tool and receives a box shape in the case shown.

Figure 8:
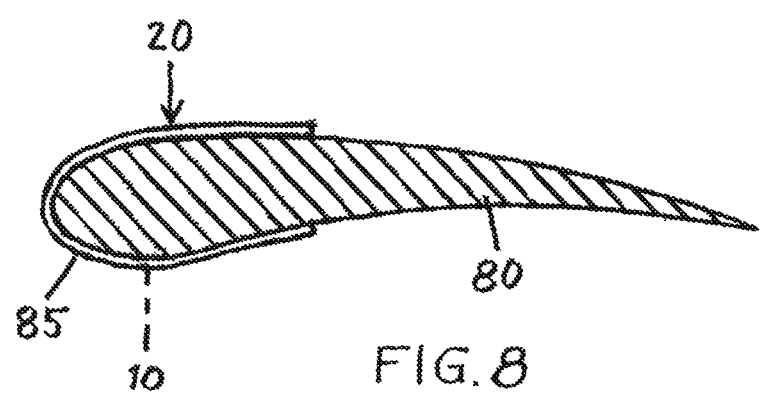
FIG. 8 shows schematically a cross section of a rotor wing for a wind turbine, representing an example of a product that is completed in accordance with the method according to the invention.

FIG. 8 shows a product in the form of a rotor vane/wing 80 for a wind turbine that has been completed with a mat 20 according to the invention. The mat has been formed to lie close to the wing, wherein any protective foil is removed in advance on the contact side of the mat with the wing. On the outer side of the mat facing away from the wing, a wear-resistant protective film/foil 85 can be arranged, for example. Then controlled final curing takes place through resistance measurement in the article 10 and supplying heat in one of the previously described ways. The mat 20 adheres to the wing 80 upon curing and thus completes the wing/product. The article 10 in the mat 20 is then used to map the risk of ice formation by resistance measurement and to counter ice formation by the supply of electric power.

It is understood from the above that the coherent and incompletely cured mat 20 according to the invention can be an intermediate product that can be used for preparation of a new product, but also as a complement to an existing product. The coherent and incompletely cured mat 20 can naturally also be sold as a separate product.

The thermosetting plastic can be of polyester, epoxy plastic or polyurethane, for example, and any reinforcement can be of glass fibre or carbon fibre, for example.

By applying a plurality of smaller mats to a product, for example, the operating safety can sometimes be improved and any repair work simplified.

It is understood that the mat according to the invention can also be used for the manufacture of a separate product, which is placed by an object that is to be heated or kept free of ice, for example, wherein any adaptation to the shape of the object is possible. A mat can thereby be finally cured, for example, to a separate product, which is optionally completed with attachment details.

With regard to the electric heating of the mat, many possible variations naturally exist as far as electric power supply, electrical performance, regulating equipment etc. are concerned. Both alternating current and direct current can be used.

The mat can be used, for example, as a heat mat, penetration protection (alarm in the event of a wire break), crack indication on the mat or on the product that it completes by adhesion, temperature measurement etc. Temperature-controlled deicing including ice formation indication even at high movement speeds falls within the field of competence of the mat, wherein naturally regulating equipment suitable for the purpose is used. Applications for deicing, heating and temperature control in the building industry, construction industry, roads, pavements, bridges, tunnels etc. are non-limiting examples of application areas.

Another non-limiting example of an application area in the automotive industry is the application of the mat, for example, to air-controlling vanes on Formula 1 cars to facilitate early crack indication and thereby reduce the risk of accidents, wherein any vane cracks can be discovered by resistance measurement in the mat's article.

A non-limiting example of use in the indoor environment is underfloor heating, for example, anti-slip protection, a sealing layer in a bathroom, for example, etc., wherein the incompletely cured mat can be sold as a separate product that can be mounted and finally cured in the intended position.

The mat can easily be completed with a protective film/foil suitable for the purpose with desired properties such as wear resistance, for example, and attractive aesthetic characteristics, etc. The protective foil can also follow the mat to the site of use and continue to serve as wear protection etc. The protective foil is fixedly cured in this case upon final curing.

Any required attachment details when the finally cured mat or mats forms/form a separate product can easily be integrated with the product.

It shall thus be understood that the mat according to the invention has a very large application range in which great variation possibilities exist.

The invention is thus not limited to what has been shown and described, but changes and modifications of it are naturally conceivable within the scope of the following claims.

The invention claimed is:

1. A product comprising a layer formed from an electrically conductive material, and a flexible mat formed from an incompletely cured thermosetting plastic, said layer and said flexible mat arranged such that one side of said layer directly contacts one side of said flexible mat.

2. Product according to claim 1, wherein said layer of electrically conductive material is formed in a nonlinear pattern by knitting or crocheting.

3. Product according to claim 1, wherein said layer consists exclusively of an insulated electrically conductive material.

4. Product according to claim 2, wherein said layer is formed exclusively from said electrically conductive material.

5. Product according to claim 1, wherein said product includes a second a flexible mat formed from an incompletely cured thermosetting plastic, said second flexible mat having one side arranged in direct contact with a second side of said layer comprising said electrically conductive material.

6. Product according to claim 1, wherein said product includes a removable protective foil applied to a side of the flexible mat of incompletely cured thermosetting plastic facing away from the layer of electrically conductive material.

7. Product according to claim 5, wherein said product includes a removable protective foil applied to a side of each said flexible mat facing away from the layer of electrically conductive material.

8. Product according to claim 1, wherein said product includes means for controlling electrical flow through said electrically conductive material for final curing of the mat formed from the incompletely cured thermosetting plastic.

9. Product according to claim 1, wherein said product is formed in the shape of a forming tool.

10. Product according to claim 1, wherein said product is formed in the shape of an article to which it is to be attached.

* * * * *